United States Patent
Sandholm et al.

(10) Patent No.: US 7,783,529 B2
(45) Date of Patent: Aug. 24, 2010

(54) MARKET CLEARABILITY IN COMBINATORIAL AUCTIONS AND EXCHANGES

(75) Inventors: Tuomas Sandholm, Pittsburgh, PA (US); Subhash Suri, Santa Barbara, CA (US)

(73) Assignee: CombineNet, Inc., Pittsburgh, PA (US)

( * ) Notice: Subject to any disclaimer, the term of this patent is extended or adjusted under 35 U.S.C. 154(b) by 1813 days.

(21) Appl. No.: 10/410,876

(22) Filed: Apr. 10, 2003

(65) Prior Publication Data

US 2003/0225628 A1 Dec. 4, 2003

Related U.S. Application Data

(60) Provisional application No. 60/371,390, filed on Apr. 10, 2002.

(51) Int. Cl.
*G06Q 10/00* (2006.01)
*G06Q 99/00* (2006.01)
(52) U.S. Cl. ............................................ 705/28; 705/1
(58) Field of Classification Search .................. 705/37, 705/26, 28
See application file for complete search history.

(56) References Cited

U.S. PATENT DOCUMENTS

| | | | |
|---|---|---|---|
| 5,689,652 A | 11/1997 | Lupien et al. | |
| 6,415,270 B1 * | 7/2002 | Rackson et al. | 705/36 R |
| 6,704,716 B1 | 3/2004 | Force | |
| 6,718,312 B1 | 4/2004 | McAfee et al. | |
| 7,062,460 B1 * | 6/2006 | Growney et al. | 705/37 |
| 7,124,106 B1 * | 10/2006 | Stallaert et al. | 705/37 |
| 7,249,027 B1 * | 7/2007 | Ausubel | 705/1 |
| 7,315,835 B1 * | 1/2008 | Takayasu et al. | 705/35 |
| 7,343,342 B2 * | 3/2008 | Ausubel | 705/37 |
| 7,599,866 B2 * | 10/2009 | Yan et al. | 705/35 |
| 2002/0013631 A1 * | 1/2002 | Parunak et al. | 700/28 |
| 2002/0069134 A1 * | 6/2002 | Solomon | 705/26 |
| 2003/0028473 A1 * | 2/2003 | Eso et al. | 705/37 |
| 2006/0265323 A1 * | 11/2006 | Winter et al. | 705/37 |

OTHER PUBLICATIONS

Sandholm, eMediator: A Next Generation Electronic Commerce Server 2000, ACM, International Conference on Autonomous Agents, Proceedings of the fourth international conference on Autonomous agents, pp. 341-348.*

Sandholm, eMediator: A Next Generation Electronic Commerce Server 2000, ACM, International Conference on Autonomous Agents, Proceedings of the fourth international conference on Autonomous agents, pp. 341-348.*

Yuzo Fujishima, Kevin Leyton-Brown and Yoav Shoham, "Taming the Computational Complexity of Combinatorial Auctions: Optimal and Approximate Approaches", In Proceedings of the Sixteenth International Joint Conference on Artificial Intelligence (IJCAI), 6 pp., 1999.

(Continued)

*Primary Examiner*—Matthew S Gart
*Assistant Examiner*—Garcia Ade
(74) *Attorney, Agent, or Firm*—The Webb Law Firm

(57) ABSTRACT

A method of determining a winning allocation in an auction or exchange includes receiving at least one buy bid that includes a price-quantity demand curve and/or receiving at least one sell bid that includes a price-quantity supply curve. The received curves are utilized to determine clearing prices therefor that maximize a clearing surplus. A winning allocation is determined based on the clearing prices.

6 Claims, 4 Drawing Sheets

OTHER PUBLICATIONS

Tuomas W. Sandholm, "An Algorithm For Optimal Winner Determination In Combinatorial Auctions", Department of Computer Science, Washington University, pp. 6, Jan. 1999.

Tuomas W. Sandholm, "eMediator: A Next Generation Electronic Commerce Server", Department of Computer Science, Washington University, pp. 341-348, Jun. 2000.

Moshe Tennenholtz, "Some Tractable Combinatorial Auctions", American Association for Artificial Intelligence, 6 pp., Aug. 2000.

Tuomas Sandholm and Subhash Suri "Improved Algorithms For Optimal Winner Determination In Combinatorial Auctions and Generalizations", pp. 1-19, Aug. 2000.

Peter R. Wurman, Michael P. Wellman and William E. Walsh, "The Michigan Internet AuctionBot: A Configurable Auction Server For Human And Software Agents", In Proceedings of the Second International Conference on Autonomous Agents (Agents-98), May 1998.

Jayant R. Kalagnanam et al., "Computational aspects of clearing continuous call double auctions with assignment constraints and indivisible demand", IBM Research Report RC21660(97613), Feb. 2, 2000, pp. 1-15.

Marta Eso et al., "Bid Evaluation in Procurement Auctions with Piece-Wise Linear Supply Curves", IBM Research Report RC22219 (W0110-087), Oct. 31, 2001, pp. 1-35.

Jayant Kalagnanam et al., "Minimizing Procurement Costs for Strategic Sourcing", IBM White Paper, IBM T.J. Watson Research Center, 2001, 6 pages.

Andrew J. Davenport et al., "Price negotiations for procurement of direct inputs", IBM Technical Report RC 22078, May 31, 2001, pp. 1-21.

* cited by examiner

MARKET CLEARABILITY IN COMBINATORIAL AUCTIONS AND EXCHANGES

CROSS REFERENCE TO RELATED APPLICATION

This application claims priority from U.S. Provisional Patent Application Ser. No. 60/371,390, filed Apr. 10, 2002, entitled "Market Clearability".

BACKGROUND OF THE INVENTION

1. Field of the Invention

The present invention is directed to combinatorial auctions and exchanges and, more specifically, to determining winning allocations in combinatorial auctions and exchanges.

2. Description of Related Art

Commerce is moving online to an increasing extent, and there has been a significant shift to dynamic pricing via auctions (one seller, multiple buyers), reverse auctions (one buyer, multiple sellers), and exchanges (multiple buyers, multiple sellers). These market types have also become key coordination methods in multi-agent systems. These trends have led to an increasing need for fast market clearing algorithms. Recent electronic commerce server prototypes have demonstrated a wide variety of new market designs, leading to the need for new clearing algorithms.

There has been a recent surge of interest in clearing combinatorial auctions where bids can be submitted on bundles of distinguishable items, potentially multiple units of each. There has also been recent work on clearing combinatorial reverse auctions and combinatorial exchanges. The clearing problem in a combinatorial market is NP-complete, inapproximable, and in certain variants even finding a feasible solution is NP-complete. On the other hand, markets where there is only one unit of one item for sale are trivial to clear.

Another type of market setting is the ubiquitous one where there are multiple indistinguishable units of an item for sale. This setting is common in markets for stocks, bonds, electricity, bandwidth, oil, pork bellies, memory chips, CPU time, etc.

The naïve approach to bidding a multi-unit market would require the bidders to express their offers as a list of points, for example ($2 for 1 unit) XOR ($5 for 2 units) XOR ($6 for 3 units), etc. The mapping from quantities to prices can be represented more compactly by allowing each bidder to express his offer as a price-quantity curve (supply curve for a seller, demand curve for a buyer). Such curves are natural ways of expressing preferences, are ubiquitous in economics, and are becoming common in electronic commerce as well.

In classic economic theory of supply and demand curves (called partial equilibrium theory), the market is cleared as follows. The supply curves of the sellers and the demand curves of the buyers are separately aggregated. The market is cleared at a per-unit price for which supply equals demand (there may be multiple solutions). This way of clearing the market maximizes social welfare.

However, it turns out that the auctioneer (that is, the party who runs the market—who is neither a buyer or a seller) will achieve greater (or equal) profit from the same supply/demand curves by reducing the number of units traded, and charging one per-unit price to the buyers while paying a lower per-unit price to the sellers. We call such pricing non-discriminatory because each buyer pays the same amount per unit, and each seller gets paid the same amount per unit. The auctioneer's profit can be further improved by moving to discriminatory pricing where each seller and each buyer can be cleared at a different per-unit price.

It is, therefore, desirable to provide a method for clearing, or determining the winning allocation, in a forward auction, reverse auction, or exchange, when discriminatory and non-discriminatory pricing are in effect, that maximizes a clearing surplus. Still other desirable features will become apparent to those of ordinary skill in the art upon reading and understanding the following detailed description.

SUMMARY OF THE INVENTION

The invention is a computer-implemented method of determining a winning allocation in an auction or exchange that includes receiving at least one buy bid that includes a price-quantity demand curve and at least one sell bid that includes a price-quantity supply curve. The demand and supply curves are utilized to determine clearing prices for the buy and sell bids that maximize a clearing surplus. The winning allocation is determined based on the clearing prices.

Each curve can be a linear curve, a piecewise linear curve, a non-linear curve, a piecewise non-linear curve and/or one or more price-quantity pairs.

The clearing prices can be determined based on whether the bids have discriminatory pricing or non-discriminatory pricing. If the method is used with the forward auction, one sell bid and a plurality of buy bids are received. If the method is utilized in connection with the reverse auction, one buy bid and a plurality of sell bids are received. If the method is utilized with an exchange, a plurality of buy bids and a plurality of sell bids can be received.

The invention is also a computer-implemented method of determining a winning allocation in an auction. The method includes receiving from a bidder a bid that includes a price-quantity curve for an item. The price-quantity curve is referenced to a Cartesian coordinate system that has an origin where axes representing price and quantity meet. The position of a point on the price-quantity curve that maximizes an area of a rectangle that is bounded by the origin and the demand curve is determined. The price-quantity pair represented by said point on the price-quantity curve is included in the winning allocation.

In a forward auction, the quantity associated with the point on the price-quantity curve is no more than the total quantity of the item available. In a reverse auction, the quantity associated with the point on the price-quantity curve is no less than the total quantity of the item required.

The invention is also a computer-implemented method of determining a winning allocation in an auction that includes receiving from each of a plurality of bidders for an item a bid for said item that includes a price-quantity curve. An aggregate curve is formed that includes the sum of the quantities of price-quantity curves. The aggregate curve is referenced to a Cartesian coordinate system that has an origin where axes representing price and quantity meet. The position of a point on the aggregate curve that, for a forward auction, maximizes an area of a rectangle that is bounded by the origin and the aggregate curve and, for a reverse auction, minimizes the area of said rectangle is determined. The position of a point on each price-quantity curve where the price associated therewith is the same as the price associated with the point on the aggregate curve is determined. The price-quantity pair associated with the points on the price-quantity curves are included in the winning allocation.

When the price-quantity curves are aggregated to form the aggregate curve, each instance where a quantity on the aggregate curve has two or more prices associated therewith, the price having the greatest value is associated with said quantity. An instance where this might occur is when the aggregate curve is formed from two or more piecewise linear or nonlinear curves.

The invention is also a computer-implemented method of determining a winning allocation in a forward auction. The method includes receiving from each of a plurality of bidders for an item a bid for said item that includes a price-quantity demand curve. Each demand curve is referenced to a Cartesian coordinate system that has an origin where axes representing price and quantity meet. The position of a point on each demand curve that maximizes an area of a rectangle that is bounded by said demand curve and said origin is determined. The quantities associated with the points on the demand curves are summed and, if this sum is no more than the total quantity of the item available, the price-quantity pairs associated with the points on the demand curves are included in the winning allocation.

However, if the sum is greater than the total quantity of the item available, a list S is formed of all the demand curves. The demand curve in list S having the lowest price associated therewith is identified. The position of points on the demand curve in list S are adjusted whereupon the price associated with each adjusted point is increased by said lowest price. The quantities associated with the adjusted points on the demand curves in list S are summed. If this sum is no more than the total quantity of the item available, the quantity associated with the adjusted point on each demand curve and the price $p_i$ determined utilizing the following equation are included in the winning allocation.

$$p_i = [-b_i/(2a_i)] - [(\sum_{j \text{ in } S} b_j - 2Q)/(2\sum_{j \text{ in } S} a_j)]$$

where
S=list of demand curves;
i=the demand curve under consideration;
j in S=each demand curve j in S;
Q=total number of units of the item available;
$a_i$ and $b_i$=coefficients of the demand curve under consideration, i.e., $q_i=(a_i)(p_i)+b_i$; and
$a_j$ and $b_j$=coefficients of each demand curve other than the demand curve under consideration, i.e., $q_j=(a_j)(p_j)+b_j$.

If the latter quantity sum is greater than the total quantity of the item available, the demand curve having the point having the lowest price associated therewith is deleted from list S and the foregoing steps after forming list S are repeated until the quantity associated with the adjusted point on each demand curve and the price for each demand curve determined utilizing the above equation are included in the winning allocation.

The invention is also a computer-implemented method of determining a winning allocation in reverse auction. The method includes receiving from each of a plurality of sellers of an item a bid for a said item that includes price-quantity supply curve of the form.

$q=ap+b$, where
q=quantity;
p=price;
a=slope of the supply curve; and
b=offset of the quantity of the supply curve from a quantity of zero.

The supply curves are sorted in increasing order of the ratio b/a for each supply curve. Next, for each supply curve in a list S of adjacent supply curves in the sorted order, a clearing price $p_i$ and a clearing quantity $q_i$ are determined utilizing the following equations.

Clearing quantity: $q_i = (-b_i/2) + (a_i/2)((2Q + \sum_{j \text{ in } S} b_j)/(\sum_{j \text{ in } S} a_j))$ Clearing price: $p_i = (-b_i/2a_i) + (1/2)((2Q + \sum_{j \text{ in } S} b_j)/(\sum_{j \text{ in } S} a_j))$ where
i=the supply curve under consideration;
j in S=each supply curve j in S;
Q=total number of units of the item available;
$a_i$ and $b_i$=coefficients of the supply curve under consideration, i.e., $q_i=(a_i)(p_i)+b_i$; and
$a_j$ and $b_j$=coefficients of each supply curve other than the supply curve under consideration, i.e., $q_j=(a_j)(p_j)+b_j$.

From the clearing prices determined thus far, the clearing price having the largest value is identified. If the value of this clearing price is less than the ratio b/a of the next supply curve in the sorted order that is not already in list S, or if list S includes all of the supply curves, the clearing prices and the clearing quantities determined thus far are included in the winning allocation. Otherwise, the next supply curve in the sorted order that is not already in list S is included therein. The foregoing steps after sorting the supply curves in increasing order of ratio b/a are repeated until the clearing prices and the clearing quantities determined thus far are included in the winning allocation.

The method can terminate early if the clearing quantity $q_i$ of any seller is determined to have a value less than zero. The list S can initially only include the supply curve having the smallest ratio b/a.

The method is also a computer-implemented method of determining a winning allocation in an exchange. The method includes receiving from a buyer a price-quantity demand curve for an item and receiving from a seller a price-quantity supply curve for the item. The demand and supply curves are referenced to a Cartesian coordinate system having an origin where axes representing price and quantity meet. The positions of points on the demand and supply curves that maximize an area of a rectangle that is bounded by the demand and supply curves and the price axis are determined. Each such point has the same quantity associated therewith and the price associated with the point on the demand curve is greater than the price associated with the point on a supply curve. The price-quantity pairs associated with the points on the demand and supply curves are included in the winning allocation.

The invention is also a computer-implemented method of determining a winning allocation in an exchange that includes receiving from each of a plurality for bidders for an item a bid for said item that includes a price-quantity demand curve and receiving from each of a plurality of sellers of the item a bid for said item that includes a price-quantity supply curve. An aggregate demand curve is formed that includes the sum of the quantities of the demand curves and an aggregate supply curve is formed that includes the sum of the quantities of the supply curves. The aggregate demand curve and the aggregate supply curve are referenced to a Cartesian coordinate system. The position of a point on each of the aggregate demand curve and the aggregate supply curve is determined that maximizes an area of a rectangle that is bounded by the aggregate demand curve, the aggregate supply curve and the price axis of the Cartesian coordinate system. Each of these points has the same quantity associated therewith and the price associated with the point on the aggregate demand curve is greater than the price associated with the point on the aggregate supply curve. The position of a point on each demand curve where the price associated therewith is the same as the price associated with the point on the aggregate demand curve is determined. The position of a point on each supply curve where the price associated therewith is the same as the price associated with the point on the aggregate supply curve is also determined. The price-quantity pairs associated with the points on the demand curves and the points on the supply curves are then included in the winning allocation.

When the demand curves are aggregated to form the aggregate demand curve, each instance where a quantity on the aggregate demand curve has two or more prices associated therewith, the price having the greatest value is associated with said quantity. When supply curves are aggregated to form the aggregate supply curve, each instance where a quantity of the aggregate supply curve has two or more prices associated therewith, the price having the least value is associated with said quantity.

Lastly, the invention is a computer-implemented method of determining a winning allocation in an exchange that includes receiving a plurality of price-quantity demand curves and a plurality of price-quantity supply curves. Each demand curve and each supply curve is of the form $$q=ap+b,$$

where
$q$=quantity,
$p$=price,
$a$=slope of the supply curve, and
$b$=offset of the quantity of the supply curve from a quantity of zero.

For each price-quantity demand curve, the point thereon where the product of the price-quantity pair represented by said point is maximized is determined. An aggregate revenue-quantity demand curve is formed as a function of the thus determined points and the demand curves and an aggregate cost-quantity supply curve is formed as a function of the supply curves. The aggregate demand curve and the aggregate supply curve are compared to determine the location of points thereon where a difference in price therebetween for a specific quantity is maximized. The price-quantity pairs associated with said points on the aggregate demand curve and the aggregate supply curve are included in the winning allocation.

One or more of the foregoing steps can be reduced to a computer program which can be stored on computer readable medium and executed by a processor to cause the processor to perform said steps.

DETAILED DESCRIPTION OF THE INVENTION

The present invention will be described with reference to the accompanying figures where like reference numbers correspond to like elements.

In the following description, in connection with an auction, it is assumed that an auctioneer has a finite number Q of units of a good to sell. The auctioneer's goal is to maximize the revenue. Bidders, both buyers and sellers, express their demand as a function of price using price-quantity curves that are superimposed in, or referenced with respect to, a Cartesian coordinate system having its x-axis 6 representing the unit price and its y-axis 8 representing the number of units demanded for each price. Examples of such curves include linear curves, piecewise linear curves, non-linear curves, piecewise non-linear curves, price-quantity pairs and various combinations thereof.

Each curve can be upward sloping (a positive slope), downward sloping (a negative slope), constant sloping (a zero (0) slope) or combinations thereof. For simplicity of description, the present invention will be described in connection with each buyer expressing their demand as a function of price using a price-quantity demand curve and with each seller expressing their demand as a function of price using a price-quantity supply curve. Moreover, for simplicity of description, each curve will be described as being a linear curve. However, this is not to be construed as limiting the invention.

In practice, the auctioneer can "clear" each bidder only at a point on the corresponding curve, i.e., at a unique price-quantity pair on the curve. Thus, the point on a curve where the auctioneer "clears" a bidder uniquely determines the quantity of units allocated to the bidder and the per unit price for said quantity of units.

In the following detailed description, methods are disclosed for non-discriminatory price clearing and discriminatory price clearing in connection with auctions and exchanges.

Figure 1:
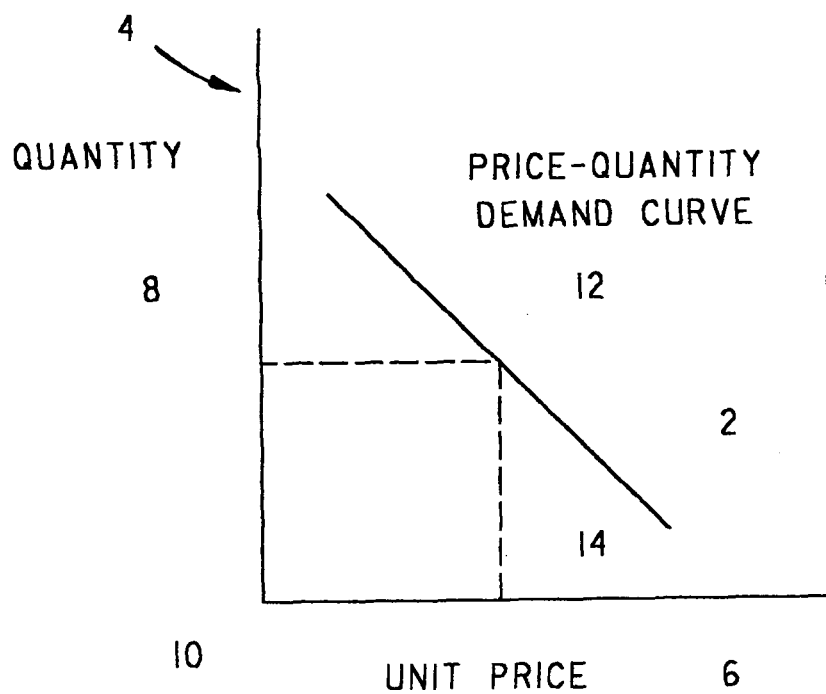
FIG. 1 shows a linear price-quantity demand curve in a coordinate system, with a rectangle of maximum size between the demand curve and the origin of the coordinate system.

With reference to FIG. 1, suppose a bidder submits a bid for an item that includes a price-quantity demand curve 2. For purpose of illustration, price-quantity demand curve 2 is superimposed in, or referenced to, a Cartesian coordinate system 4 having an x-axis 6 that represents unit price, a y-axis 8 that represents quantity and an origin 10 where x-axis 6 and y-axis 8 meet.

Once the relationship of price-quantity demand curve 2 and Cartesian coordinate system 4 have been established, the position of a point 12 on price-quantity demand curve 2 that maximizes an area of a rectangle 14 that is bounded by origin 10 and demand curve 2 is determined. This point 12 represents the optimal clearing price for demand curve 2, i.e., the price where the bidder associated with demand curve 2 will receive the most value per unit of the item. Accordingly, the price-quantity pair represented by point 12 is included in a winning allocation.

In a forward auction, the quantity associated with point 12 on demand curve 2 is no more than the total quantity of the item available. In contrast, in a reverse auction, the quantity associated with point 12 on the demand curve is no less than the total quantity of the item available.

Figure 2:
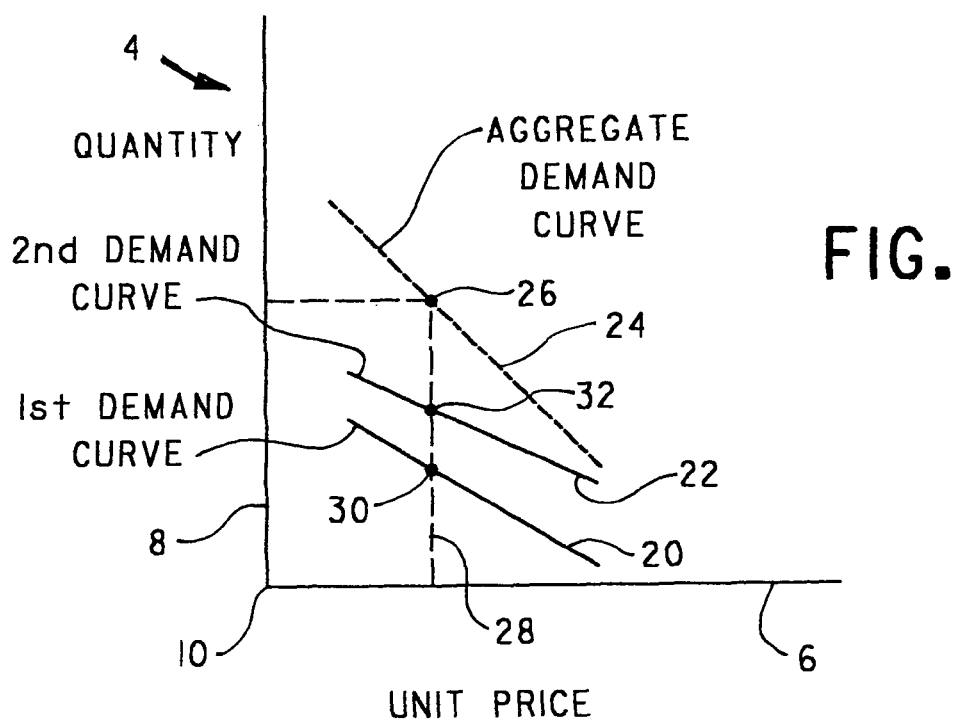
FIG. 2 shows a pair of demand curves and an aggregate demand curve in a coordinate system, with a rectangle of maximum size between the aggregate demand curve and the origin of the coordinate system.

With reference to FIG. 2, when each of a plurality of bidders for an item submits a bid for said item that includes a price-quantity demand curve, it may be desirable in the determination of the winning allocation to pay each bidder a different price, i.e., discriminatory pricing, for the same quantity of the item based on the bidders demand curve. For example, suppose a first bidder submits a first bid that includes a first price-quantity demand curve 20 for an item and a second bidder submits a second bid that includes a second price-quantity demand curve 22 for the item. From demand curves 20 and 22, an aggregate demand curve 24 is formed that includes the sum of the quantities of first and second demand curves 20 and 22 at each unit price.

Aggregate demand curve 24 is superimposed in, or referenced to, Cartesian coordinate system 4. The position of a point 26 on aggregate demand curve 24 that maximizes an area of a rectangle 28 that is bounded by origin 10 and aggregate demand curve 24 is then determined.

Next, the position of points 30 and 32 on first and second demand curves 20 and 22, respectively, where the price associated therewith is the same as the price associated with point 26 on aggregate demand curve 24 are determined. The price-quantity pair associated with points 30 and 32 on first and second demand curves 20 and 22 are then included in the winning allocation in connection with the item.

It is possible that the aggregation of certain types of demand curves (not shown), e.g., piecewise demand curves, may result in the formation of an aggregate demand curve wherein a quantity thereof has two or more prices associated therewith. Under this circumstance, it is desirable in a forward auction to utilize the price having the greatest value for said quantity and it is desirable in a reverse auction to utilize the price having the least value for said quantity.

In a forward auction, the quantity associated with point 26 on aggregate demand curve 24 is no more than the total quantity of the item available. In contrast, in a reverse auction, the quantity associated with point 26 on aggregate demand curve 24 is no less than the total quantity of the item available.

In the foregoing example discussed in connection with FIG. 2, the price associated with points 30 and 32 were the same. Thus, the example discussed in connection with FIG. 2 is an example of a non-discriminatory pricing auction, i.e., an auction where each bid is cleared at the same price. However, it may be desirable in optimizing the winning allocation to conduct an auction where discriminatory pricing is permitted.

Figure 3:
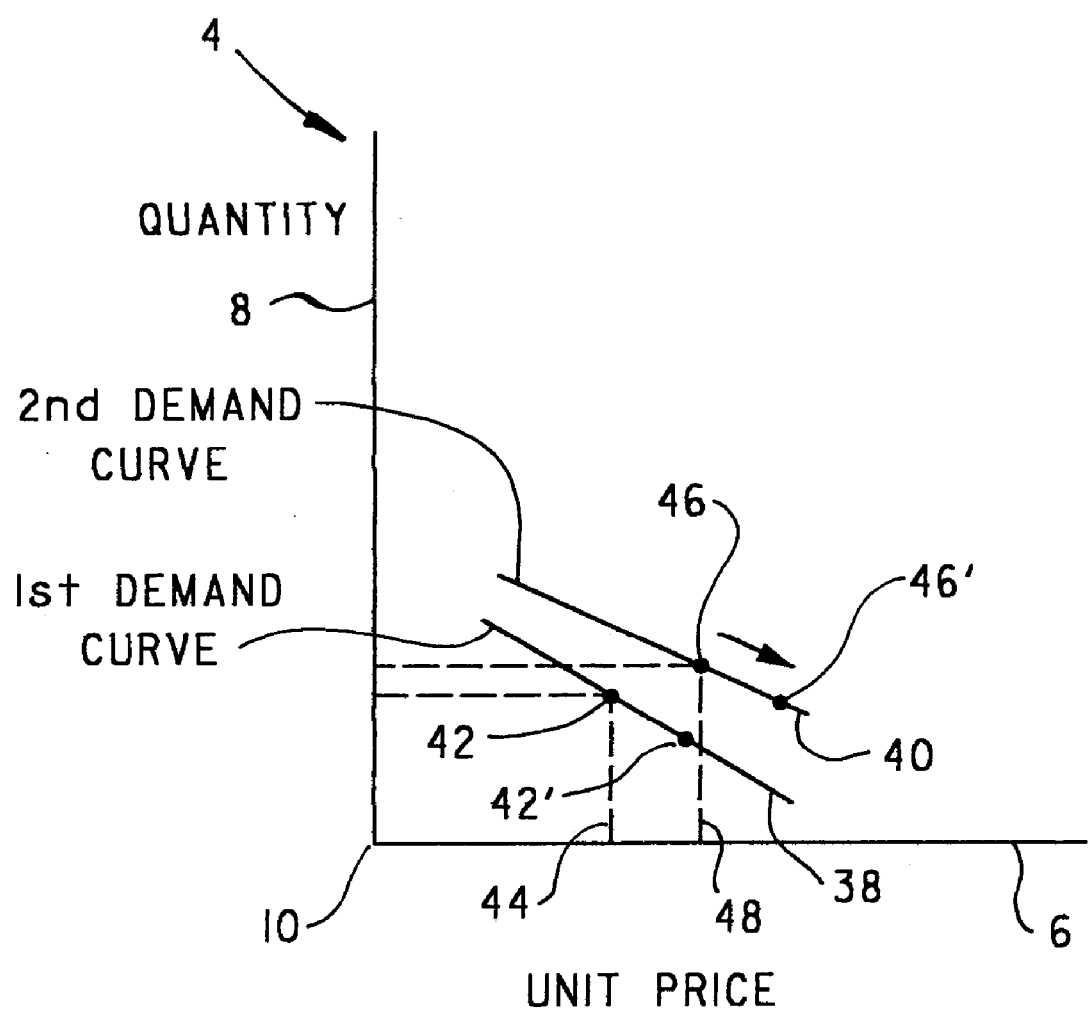
FIG. 3 shows a pair of demand curves referenced in a coordinate system, with each demand curve including a rectangle of maximum size between the demand curve and the origin of the coordinate system.

With reference to FIG. 3, an example of the present invention in connection with discriminatory pricing will now be described. Initially, a plurality of bidders each submit a bid that includes a price-quantity demand curve, e.g., 38 and 40, for an item. Each demand curve 38 and 40 is superimposed in, or referenced to, Cartesian coordinate system 4. A point 42 on demand curve 38 that maximizes an area of a rectangle 44 that is bounded by demand curve 38 and origin 10 is determined. The position of a point 46 on demand curve 40 that maximizes an area of a rectangle 48 that is bounded by demand curve and origin 10 is also determined. The quantities associated with points 42 and 46 on demand curves 38 and 40, respectively, are summed. If this sum is no more than the total quantity of the item available, the price-quantity pairs associated with points 42 and 46 on demand curves 38 and 40, respectively, are included in the winning allocation.

However, if the sum of the quantities associated with points 42 and 46 are greater than the total quantity of the item available, the submitted demand curves are placed into a list and the demand curve with the point having the lowest price associated therewith is identified. In the example shown in FIG. 3, point 42 on demand curve 38 has the lowest price associated therewith.

Next, the position of points 42 and 46 on demand curves 38 and 40, respectively, are adjusted whereupon the price associated with adjusted points 42 and 46 are increased by the price associated with point 42 on demand curve 38. This adjusted position of points 42 and 46 on demand curves 38 and 40 are illustrated by reference numbers 42' and 46', respectively. In a similar manner, if other demand curves (not shown) were submitted, points on these other demand curves would be increased by the price associated with point 42 on demand curve 38.

Next, the quantities associated with the adjusted position of points on the demand curves in the list are summed. Thus, in FIG. 3, the quantities associated with the positions of adjusted points 42' and 46' are summed.

If the thus-determined sum is no more than the total quantity of the item available, the quantity associated with the adjusted position of each point on each demand curve is included in the winning allocation. To determine the price associated with the adjusted position of each point on one of the demand curves in the list, the following equation 1 (EQ1) is utilized.

EQ1: $$p_i = [-b_i/(2a_i)] - [(\sum_{j\,in\,S} b_j - 2Q)/(2\sum_{j\,in\,S} a_j)]$$

where
S=list of demand curves;
i=the demand curve under consideration;
j in S=each demand curve j in S;
Q=total number of units of the item available;
$a_i$ and $b_i$=coefficients of the demand curve under consideration, i.e., $q_i=(a_i)(p_i)+b_i$; and
$a_j$ and $b_j$=coefficients of each demand curve other than the demand curve under consideration, i.e., $q_j=(a_j)(p_j)+b_j$.

However, if the sum associated with the position of the adjusted points on the demand curves is still greater than the total the quantity of the item available, the demand curve having the lowest price associated with the original position of the point thereon, e.g., demand curve 38, is removed from the list of demand curves and the demand curve with the point having the next lowest price associated with the original position of the point thereon is identified. The position of the adjusted points on the remaining demand curves are further adjusted whereupon the price associated with each further adjusted point is further increased by said next lowest price. The quantities associated with the further adjusted points on the demand curves still remaining in the list are then summed.

If this sum is greater than the total quantity of the items available, the demand curve in the list having the lowest price associated with the original position of the point thereon is removed from the list of demand curves and the demand curve with the point having the next lowest price associated with the original position of the point thereon is identified. The foregoing steps are then repeated until the sum of the quantities associated with the further adjusted points on the demand curves remaining in the list is no more than the total quantity of the item available. Thereafter, for each demand curve remaining in the list, the quantity associated with the position of the adjusted point on the demand curves and the price determined for each demand curve utilizing equation 1 (EQ1) above are included in the winning allocation.

The example described in connection with FIG. 3 was for a discriminatory price forward auction. The following method can be utilized for determining the winning allocation in a discriminatory price reverse auction.

A plurality of sellers of an item each submit a bid for said item that includes a price-quantity supply curve of the form shown in the following equation 2 (EQ2);

$$q = ap + b, \qquad \text{EQ2}$$

where
q=quantity;
p=price;
a=slope of the supply curve; and
b=offset of the quantity of the supply curve from a quantity of zero.

The supply curves are then sorted in increasing order of the ratio b/a for each supply curve and a list S is formed that initially includes only the supply curve having the smallest ratio of b/a.

For each supply curve in list S, a clearing price $p_i$ is determined utilizing equation 3 (EQ3) and a clearing quantity $q_i$ is determined utilizing equation 4 (EQ4).

EQ3: Clearing quantity: $q_i = (-b_i/2) + (a_i/2)((2Q + \sum_{j \in S} b_j)/(\sum_{j \in S} a_j))$ EQ4: Clearing price: $p_i = (-b_i/2a_i) + (1/2)((2Q + \sum_{j \in S} b_j)/(\sum_{j \in S} a_j))$ where
i=the supply curve under consideration;
j in S=each supply curve j in S;
Q=total number of units of the item available;
$a_i$ and $b_i$=coefficients of the supply curve under consideration, i.e., $q_i=(a_i)(p_i)+b_i$; and
$a_j$ and $b_j$=coefficients of each supply curve other than the supply curve under consideration, i.e., $q_j=(a_j)(p_j)+b_j$.

From the clearing prices determined thus far, the clearing price having the largest value is identified. If the value of this clearing price is less than the ratio b/a of the next supply curve in the sorted order that is not already in list S, or if list S includes all of the supply curves, the clearing prices and the clearing quantities determined thus far are included in the winning allocation.

However, if the clearing price having the largest value is greater than or equal to the ratio b/a of the next supply curve in the sorted order not already in list S, the next supply curve in the sorted order that is not already in list S is included therein. Equations 3 and 4 are then utilized again to determine for each supply curve in list S a new clearing price $p_i$ and a new clearing quantity $q_i$.

The clearing price having the largest value is then identified. If the value of the clearing price having the largest value is less than the ratio b/a of the next supply curve in the sorted order that is not already in list S, or if list S includes all of the supply curves, the clearing prices and the clearing quantities determined thus far are included in the winning allocation. If not, however, the process of including in list S the next supply curve in the sorted order that is not already in list S; utilizing equations 3 and 4 to determine new clearing prices and clearing quantities for each supply curve in list S; identifying from the clearing prices determined thus far the clearing price having the largest value; and including in list S the next supply curve in the sorted order that is not already in list S continues until the value of the clearing price having the largest value is less than the ratio b/a of the next supply curve in the sorted order that is not already in list S or until list S includes all of the supply curves.

The foregoing steps can terminate early if the clearing quantity $q_i$ of any seller is determined to have a value less than zero.

Figure 4:
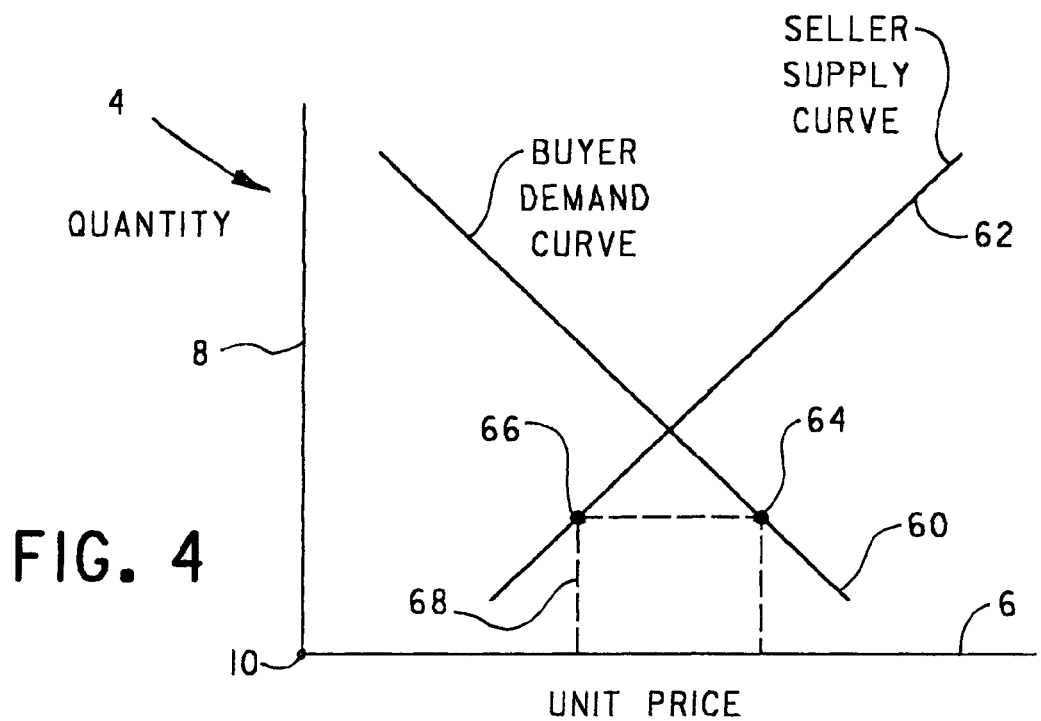
FIG. 4 shows a buyer demand curve and a seller supply curve in a coordinate system, with a rectangle of maximum size disposed between the buyer demand curve, the seller demand curve and the unit price axis of the coordinate system.

A method of determining a winning allocation in an exchange will now be described in connection with FIG. 4. In an exchange, at least one buyer submits a price-quantity demand curve 60 and at least one seller submits a price-quantity supply curve 62. Demand curve 60 and supply curve 62 are superimposed in, or referenced to, Cartesian coordinate system 4.

The positions of points 64 and 66 on demand curve 60 and supply curve 62, respectively, that maximize an area of a rectangle 68 that is bounded by demand curve 60, supply curve 62 and the unit price axis, or x-axis 6, are determined. Since the area of rectangle 68 is being determined, points 64 and 66 have the same quantity associated therewith. Moreover, rectangle 68 is desirably positioned beneath the intersection of demand curve 60 and supply curve 62 with the price associated with points 64 on demand curve 60 being greater than the price associated with points 66 on supply curve 62 since this is the only area defined by demand curve 60 and supply curve 62 where the buyer and seller would be willing to complete the transaction. The price-quantity pairs associated with points 64 and 66 are then included in the winning allocation.

Figure 5:
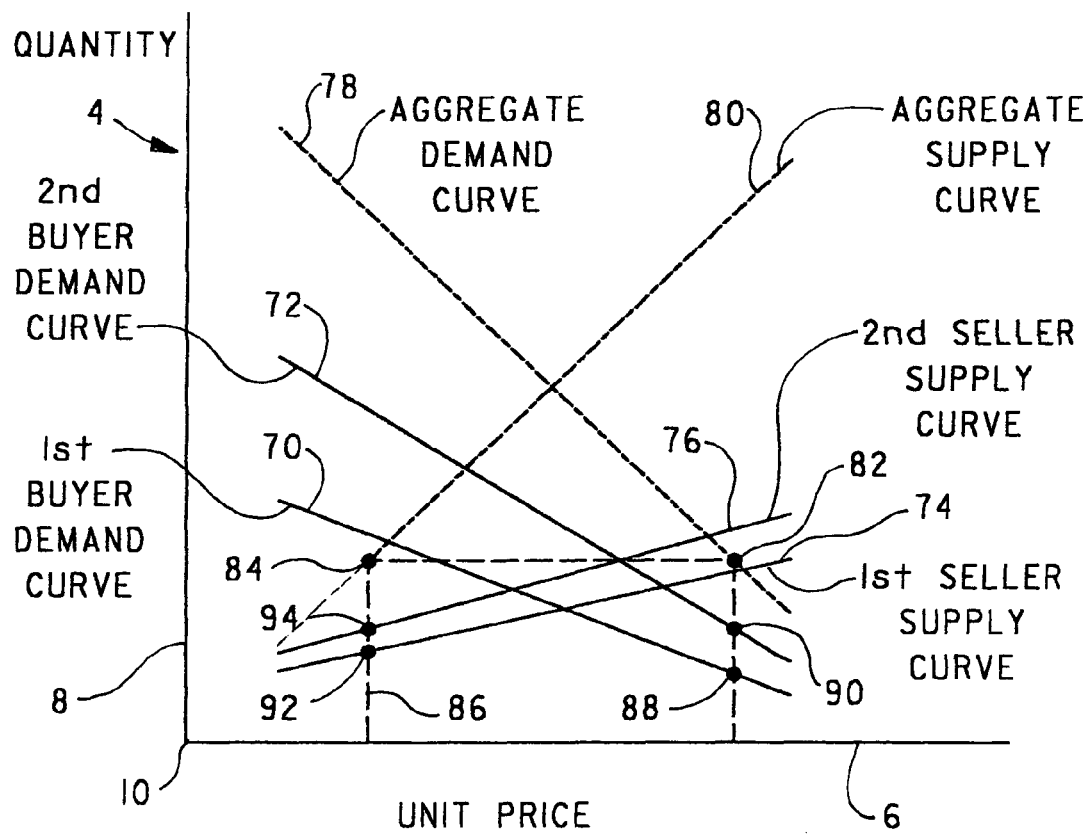
FIG. 5 shows a pair of buyer demand curves, a pair of seller supply curves, an aggregate demand curve and an aggregate supply curve in a coordinate system, with a rectangle of maximum size positioned between the aggregate demand curve, the aggregate supply curve and the unit price axis of the coordinate system.

With reference to FIG. 5, in a non-discriminatory pricing exchange, each of a plurality of buyers of an item submits a bid for said item that includes a price-quantity demand curve, e.g., demand curves 70 and 72. Similarly, each of a plurality of sellers of the item submit a bid for said item that includes a price-quantity supply curve, e.g., supply curves 74 and 76.

The quantities represented by demand curves 70 and 72 for each unit price are summed to form an aggregate demand curve 78. Similarly, the quantities represented by supply curve 74 and 76 for each unit price are summed to form an aggregate supply curve 80. Aggregate demand curve 78 and aggregate supply curve 80 are superimposed in, or referenced to, Cartesian coordinate system 4. The position of points 82 and 84 on aggregate demand curve 78 and aggregate supply curve 80, respectively, that maximize an area of a rectangle 86 that is bounded by aggregate demand curve 78, aggregate supply curve 80 and the unit price axis, or x-axis 6, are determined. As can be seen, each point 82 and 84 has the same quantity associated therewith and the price associated with the point 82 on aggregate demand curve 78 is greater than the price associated with point 84 on aggregate supply curve 80.

Next, the position of each of points 88 and 90 on demand curves 70 and 72, respectively, where the price associated therewith is the same as the price associated with point 82 on aggregate demand curve 78 is determined. Similarly, the position of each point 92 and 94 on supply curves 74 and 76, respectively, where the price associated therewith is the same as the price associated with point 84 on aggregate supply curve 80 is determined. The price-quantity pairs associated with points 88, 90, 92 and 94 are then included in the winning allocation.

Figure 6:
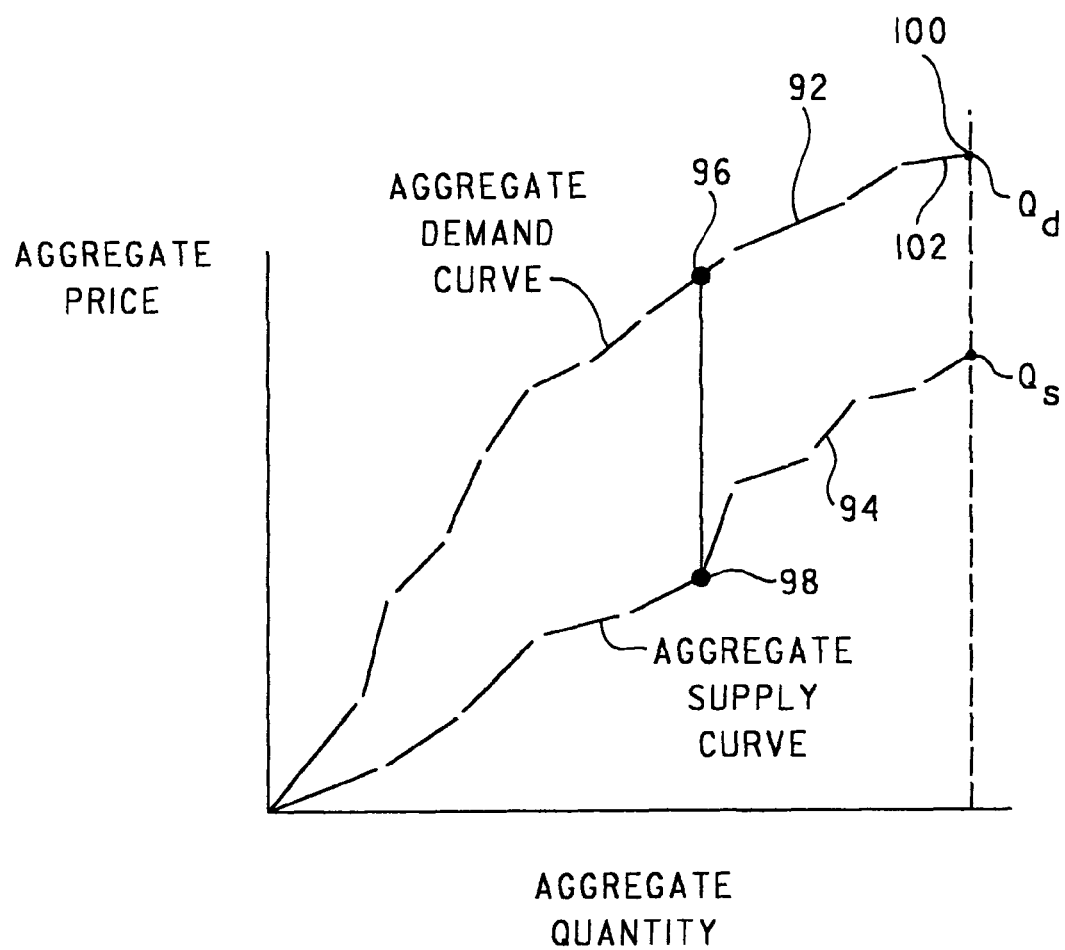
FIG. 6 shows an aggregate demand curve and an aggregate supply curve in a coordinate system that are utilized to determine the maximum surplus in a discriminatory pricing exchange.

With reference to FIG. 6, a method for determining the winning allocation in a discriminatory pricing exchange will now be described. Initially, a plurality of price-quantity demand curves and a plurality of price-quantity supply curves are received. Since each demand curve and each supply curve is a linear curve, it can be expressed in the generalized form shown in equation 2 (EQ2) above. For each price-quantity demand curve, the point thereon where the product of the price-quantity pair represented by said point is maximized is determined. An aggregate revenue-quantity demand curve 92 is formed as a function of the demand curves and the points determined thereon. An aggregate cost-quantity supply curve 94 is formed as a function of the supply curves. The aggregate demand curve 92 and aggregate supply curve 94 are compared to determine the location of points 96 and 98 thereon where a difference in price therebetween for a specific quantity is maximized. The price-quantity pairs associated with points 96 and 98 are then included in the winning allocation.

The form aggregate demand curve 92 and aggregate supply curve 94, it is necessary initially to determine the maximum quantity $Q_d$ the buyers associated with the demand curves are willing to buy and the maximum quantity $Q_s$ the sellers associated with the supply curves are willing to sell. For simplicity of illustration, $Q_d$ and $Q_s$ in FIG. 6 are illustrated as having the same quantity.

To determine the maximum demand quantity $Q_d$ the buyers associated with the demand curves are willing to buy, the sums of the quantities associated with the points on the demand curves where the product of the price-quantity pair represented by said points are maximized are determined. Thus, the initial value of the demand quantity $Q_d$ is equal to the sums of the quantities associated with the points on the demand curves where the products of the price-quantity pairs represented by the points are maximized. A list $S_d$ of demand curves is also formed.

A clearing price $p_i$ and a clearing quantity $q_i$ are then determined for each curve in list $S_d$ utilizing the following equation 5 (EQ5) and equation 6 (EQ6) respectively.

$$EQ5: p_i = (b_i/2a_i) + (1/2)((\sum_{j \text{ in } S_d} b_j - 2Q_d)/(\sum_{j \text{ in } S_d} a_j))$$

$$EQ6: q_i = (b_i/2) - (a_i/2)((\sum_{j \text{ in } S_d} b_j - 2Q_d)/(\sum_{j \text{ in } S_d} a_j))$$

where
- i=the curve under consideration;
- j in $S_d$=each curve j in $S_d$;
- $a_i$ and $b_i$=coefficients of the curve under consideration, i.e., $q_i=(a_i)(p_i)+b_i$; and
- $a_j$ and $b_j$=coefficients of each curve in S, i.e., $q_j=(a_j)(p_j)+b_j$.

For the curves in list $S_d$, the thus determined clearing prices $p_i$ are summed and the thus determined clearing quantities $q_i$ are summed. A point 100 representing the sum of the thus determined clearing prices and the sum of the thus determined clearing quantities is plotted. As shown in FIG. 6, point 100 represents one of the points that form aggregate demand curve 92.

Next, the value of $Q_d$ is decreased and new values of clearing price $p_i$ and clearing quantity $q_i$ are determined utilizing EQ5 and EQ6 to determine the location of the next point, e.g., point 102, that defines aggregate demand curve 92. This process is then repeated until the value of $Q_d$ equals zero (0).

In order to decrease the value of $Q_d$, the curve having the smallest ratio of b/a in list $S_d$ is selected. The ratio b/a for this selected curve is substituted for the value of $p_i$ in equation 5 above. Based on this substituted value of $p_i$, EQ5 is solved to determine a new value for $Q_d$. The selected curve is then removed from list $S_d$.

This new value of $Q_d$ is then utilized in EQ5 and EQ6 to determine a clearing price $p_i$ and a clearing quantity $Q_i$ for each curve remaining list $S_d$. The thus determined clearing prices $p_i$ are summed and the thus determined clearing quantities $Q_i$ are summed and a point (not shown) representing the sum of the thus determined clearing prices and the sum of the thus determined clearing quantities is plotted. This new point represents another point of aggregate demand curve 92.

To form aggregate supply curve 94, a supply quantity value $Q_s$ is initially set equal to zero (0) and a supply clearing price value $p_i$ is initially set to zero (0). The value of $Q_s$ and the value of $p_i$ define a point on the aggregate supply curve.

The supply curve having the smallest ratio of b/a is included in a list $S_s$. Thereafter, a supply curve not already included in list $S_s$ and having the next largest ratio of b/a is included in list $S_s$. The ratio b/a of the supply curve just included in list $S_s$ is substituted for the value of $p_i$. This substituted value of $p_i$ is then included in the following equation 7 (EQ7) which is solved for a new value of $Q_s$.

$$EQ7: p_i = (b_i/2a_i) + (1/2)((2Q_s + \sum_{j \text{ in } S_s} b_j)/(\sum_{j \text{ in } S_s} a_j));$$

where
- i=the selected one supply curve,
- j in $S_s$=each curve j in $S_s$,
- $a_i$ and $b_i$=coefficients of the selected one supply curve, i.e., $q_i=(a_i)(p_i)+b_i$, and
- $a_j$ and $b_j$=coefficients of each curve in $S_s$, i.e., $q_j=(a_j)(p_j)+b_j$.

The new value of $Q_s$ and the substituted value of $p_i$ define another point on the aggregate supply curve 94.

The steps of including in list $S_s$ the supply curve not already included therein having the next largest ratio, b/a; substituting this ratio of b/a for the value of $p_i$ and solving EQ7 for a new value $Q_s$ based on the new value of $p_i$ repeats until the supply quantity value $Q_s$ equals the initial demand quantity value $Q_d$ or until all of the supply curves have been included in list $S_s$.

Lastly, it is to appreciated that since the foregoing methods are desirably computer implemented, any or all of the foregoing methods can be embodied on computer readable medium as instructions which, when executed by a processor, cause the processor to perform any or all of the foregoing methods.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A computer-implemented method of determining a winning allocation in an auction comprising:

(a) a processor of a computer receiving from a bidder a bid that includes a price-quantity curve for an item;

(b) the processor of the computer referencing the price-quantity curve to a Cartesian coordinate system that has an origin where axes representing price and quantity meet;

(c) the processor of the computer determining a position of a point on the price-quantity curve that maximizes an area of a rectangle that is bounded by the origin and the price-quantity curve; and (d) the processor of the computer including in a winning allocation in connection with the item, a price-quantity pair represented by said point on the price-quantity curve.

2. The method of claim 1, wherein the price-quantity curve is either a linear curve, a piecewise linear curve, a non-linear curve, a piecewise non-linear curve, or one or more price-quantity pairs.

3. The method of claim 1, wherein:

in a forward auction, the quantity associated with the point on the price-quantity curve is no more than the total quantity of the item available; and in a reverse auction, the quantity associated with the point on the price-quantity curve is no less than the total quantity of the item required.

4. A computer readable medium having stored thereon instructions which, when executed by a processor, cause the processor to:

(a) receive from a bidder a bid that includes a price-quantity curve for an item;

(b) reference the price-quantity curve to a Cartesian coordinate system that has an origin where axes representing price and quantity meet;

(c) determine a position of a point on the price-quantity curve that maximizes an area of a rectangle that is bounded by the origin and the price-quantity curve; and (d) including in a winning allocation in connection with the item, a price-quantity pair represented by said point on the price-quantity curve.

5. The computer readable medium of claim 4, wherein the price-quantity curve is either a linear curve, a piecewise linear curve, a non-linear curve, a piecewise non-linear curve, or one or more price-quantity pairs.

6. The computer readable medium of claim 4, wherein:

in a forward auction, the quantity associated with the point on the price-quantity curve is no more than the total quantity of the item available; and in a reverse auction, the quantity associated with the point on the price-quantity curve is no less than the total quantity of the item required.

* * * * *